US011329976B2

(12) United States Patent
Ferreira et al.

(10) Patent No.: US 11,329,976 B2
(45) Date of Patent: May 10, 2022

(54) PRESENCE IDENTIFICATION (71) Applicant: HEWLETT-PACKARD DEVELOPMENT COMPANY, L.P., Houston, TX (US)

(72) Inventors: Ronaldo Rod Ferreira, Porto Alegre (BR); Endrigo Nadin Pinheiro, Porto Alegre (BR); Fabio Riffel, Porto Alegre (BR); Karyne Mayer, Porto Alegre (BR); Jose Paulo Pires, Porto Alegre (BR); Christopher C. Mohrman, Houston, TX (US); Vali Ali, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 691 days.

(21) Appl. No.: 16/079,140

(22) PCT Filed: Nov. 21, 2016

(86) PCT No.: PCT/US2016/063013
§ 371 (c)(1),
(2) Date: Aug. 23, 2018

(87) PCT Pub. No.: WO2018/093386
PCT Pub. Date: May 24, 2018

(65) Prior Publication Data
US 2019/0052627 A1 Feb. 14, 2019

(51) Int. Cl.
H04L 29/06 (2006.01)
G06F 21/44 (2013.01)
(Continued)

(52) U.S. Cl.
CPC .......... H04L 63/0838 (2013.01); G06F 21/44 (2013.01); H04L 63/0421 (2013.01);
(Continued)

(58) Field of Classification Search
CPC ............ H04L 63/0838; H04L 63/0846; H04L 63/0876; H04W 12/02; H04W 12/068;
(Continued)

(56) References Cited

U.S. PATENT DOCUMENTS 8,736,438 B1 * 5/2014 Vasquez ................. B60R 25/24
340/539.11
9,154,566 B2 10/2015 Patvarczki et al.
(Continued)

FOREIGN PATENT DOCUMENTS

CN 104756128 7/2015
EP 3065435 9/2016
(Continued)

OTHER PUBLICATIONS

Koren, "Windows Unlock with Companion (IoT) Devices", Retrieved from internet—https://docs.microsoft.com/en-us/windows/uwp/security/companion-device-unlock, 2016, 23 Pages.

*Primary Examiner* — Linglan E Edwards
(74) *Attorney, Agent, or Firm* — HP Inc. Patent Department (57) ABSTRACT Examples associated with presence identification are described. One example includes detecting a presence identifier broadcast by a mobile device. The mobile device belongs to a user. A portion of the presence identifier is generated based on a one-time password seed. The portion of the presence identifier is provided to an identification server. Identifying information associated with the user is received from the identification server. The identification server uses the portion to identify the user based on the one-time password seed. An action is performed based on the identifying information.

15 Claims, 6 Drawing Sheets (51) Int. Cl.
*H04W 12/02* (2009.01)
*H04W 12/50* (2021.01)
*H04W 12/06* (2021.01)

(52) U.S. Cl.
CPC ......... *H04L 63/0876* (2013.01); *H04W 12/02* (2013.01); *H04W 12/068* (2021.01); *H04W 12/50* (2021.01); *G06F 2221/2111* (2013.01)

(58) Field of Classification Search
CPC ........ H04W 12/50; G06F 21/35; G06F 21/44; G06F 2221/2111
See application file for complete search history.

(56) References Cited

U.S. PATENT DOCUMENTS

| | | | | |
|---|---|---|---|---|
| 9,178,889 | B2* | 11/2015 | Metral | H04W 12/068 |
| 10,862,684 | B2* | 12/2020 | Hong | H04L 9/3226 |
| 2003/0163739 | A1* | 8/2003 | Armington | G10L 17/00 |
| | | | | 726/3 |
| 2006/0209584 | A1* | 9/2006 | Devadas | G06F 21/445 |
| | | | | 365/52 |
| 2009/0249454 | A1* | 10/2009 | Yamamoto | H04W 12/06 |
| | | | | 726/5 |
| 2015/0067328 | A1 | 3/2015 | Yin | |
| 2015/0169860 | A1 | 6/2015 | Kim et al. | |
| 2015/0319142 | A1 | 11/2015 | Herberg et al. | |
| 2015/0350362 | A1* | 12/2015 | Pollack | H04L 67/26 |
| | | | | 709/217 |
| 2016/0015664 | A1 | 1/2016 | Vidyasagar et al. | |
| 2016/0173495 | A1 | 6/2016 | Joo | |
| 2016/0226845 | A1 | 8/2016 | Kim et al. | |
| 2016/0330172 | A1 | 11/2016 | Muttik | |
| 2017/0338959 | A1* | 11/2017 | Hong | H04W 4/029 |

FOREIGN PATENT DOCUMENTS

| | | |
|---|---|---|
| JP | 2014149559 | 8/2014 |
| TW | 200618576 A | 6/2006 |
| TW | 201613408 A | 4/2016 |

* cited by examiner

PRESENCE IDENTIFICATION

BACKGROUND

People use a variety of mobile devices (e.g., cell phones, tablets, laptop computers) throughout their day-to-day life and work. In business, it is sometimes desirable to use mobile devices to identify and/or authenticate individual users. This may be achieved by, for example, using a mobile device as a factor in a multi-factor authentication scheme. This could be achieved by, for example, displaying a password on the mobile device, broadcasting a beacon from the mobile device, and so forth.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with presence identification are described. As discussed above, beacons broadcast by devices may be used to identify and/or authenticate users to portions of a business's information technology infrastructure. However, privacy and/or security concerns may exist when a user's mobile device constantly broadcasts a single beacon or a beacon that includes personally identifying information regarding the user. For example, a user constantly broadcasting a beacon may be able to be tracked as they travel, visit clients, and so forth. Further, broadcasting an identical beacon may be susceptible to replay attacks that allow someone to gain access to a managed resource by transmitting a duplicate of the beacon to that resource.

To address the privacy and security challenges, a user's mobile device may be embedded with a one-time password seed, a copy of which is stored in an identification server that assists a business in managing information technology resources. Consequently, instead of broadcasting a single presence identifier, a mobile device can rotate its presence identifier according to the one-time password seed and a schedule known by the mobile device. When the presence identifier is detected by a managed device, that managed device may check with the identification server that the presence identifier is authentic. The identification server may use its copy of the one-time password seed to authenticate the user, and approve the managed device connecting to the mobile device and/or interacting with the user according to the function of the managed device.

Figure 1:
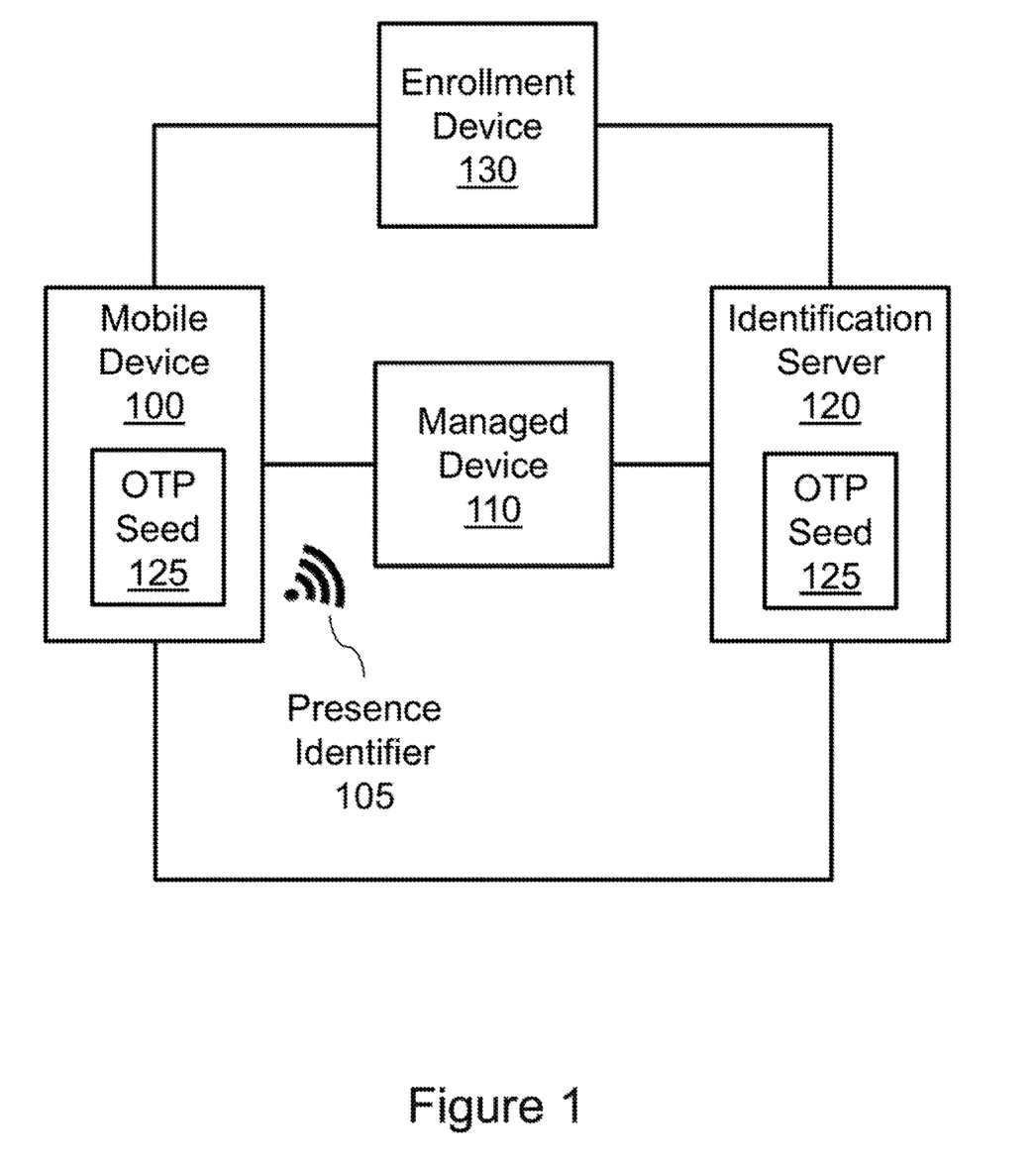
FIG. 1 illustrates example devices associated with presence identification.

FIG. 1 illustrates example devices associated with presence identification. It should be appreciated that the items depicted in FIG. 1 are illustrative examples, and many different systems, devices, and so forth, may operate in accordance with various examples.

FIG. 1 illustrates a mobile device 100. Mobile device may be, for example, a cell phone, a tablet, a laptop computer, and so forth. Mobile device 100 may be controlled by a user. The user may seek to associate themselves with mobile device 100 within a company's information technology infrastructure so that the user can take advantage of resources and devices managed by the infrastructure. This may be appropriate when, for example, the user is an employee of the company, pays for a service provided by the company, and so forth. Consequently, the user may register mobile device 100 with an identification server 120. In some examples, this registration may be processed via an enrollment device 130. Enrollment device may be, for example, the user's personal computer, a computer provided to the user by the company when the user is an employee of the company, and so forth. In other scenarios it may be appropriate for mobile device 100 to navigate registration with identification server 120 directly. This may be appropriate when mobile device 100 has a way to establish a secure connection to identification server 120.

The registration process may cause identification server 120 to store identifying information that associates the user and mobile device 100. The identifying information may also include a one-time password seed 125 that is provided to mobile device 100 as a part of the registration process. Additionally, the identifying information may also include a first public key. The first public key may be generated by mobile device 100, and pair with a first private key that mobile device stores securely. As will be discussed below, the first public key and first private key may be used by mobile device 100 to communicate securely and/or establish secure connections with devices managed by the information technology infrastructure (e.g., managed device 110).

Once mobile device 100 receives one-time password seed 125, mobile device 100 may begin periodically broadcasting a presence identifier 105. Presence identifier 105 may be generated based on one-time password seed 125 by mobile device 100. Specifically, based on a schedule known to mobile device 100 and identification server 120, mobile device 100 may broadcast a series of differing presence identifiers 105. For example, for a first period of time, mobile device 100 may broadcast a first presence identifier that is generated based on a time stamp associated with the first period of time and based on one-time password seed 125. At the beginning of a second period of time after the end of the first period of time, mobile device 100 may broadcast a second presence identifier based on a time stamp associated with the second period of time and based on one-time password 125. The length of time that mobile device 100 broadcasts an individual presence identifier may depend on the importance of security desired by a company operating identification server 120, anonymity desired by a user of mobile device 100, and so forth. In some examples, each presence identifier 105 broadcast by mobile device 100 may be uniquely generated for that particular broadcast.

The presence identifier may be detected by managed devices 110. Managed devices 110 may be devices, appliances, and so forth that make up the information technology infrastructure of a company. These devices may include, for example, printers, computers, security checkpoints, conferencing technologies, as well as other types of devices where it may be desirable to identify and/or authenticate the user of mobile device 100 to that device.

When a managed device 110 detects a presence identifier 105, the managed device my contact identification server 120 to determine if presence identifier 105 is valid. Consequently, identification server 120 may use its copy of one-time password seed 125 to validate presence identifier 105 and/or a portion of presence identifier 125 that was generated using the copy of one-time password seed 125 stored on mobile device 100. When identification server 120 successfully validates presence identifier 105, identification server 120 may provide identifying information associated with the user and/or mobile device 100 to managed device 110. This may allow managed device 110 to take some action on behalf of the user and/or mobile device 100 depending on the function of managed device 110.

The type of action taken by managed device 110 may depend on the type of function managed device 110 is designed to perform. For example, when the user walks into a conferencing room, a managed device 110 in that conference room may detect presence identifier 105 and, after verifying presence identifier 105 with identification server 130, reserve the conference room for the user. In this example managed device 110 may also, for example, begin operation of certain conference room features (e.g., a projector, a teleconferencing service), initiate a meeting associated with the user's calendar, launching a virtual desktop associated with the user's account on a computer in the conference room, and so forth. Information used to activate these various features may be obtained from identification server 130 itself, or from other devices that are a part of the information technology infrastructure to which managed device 110 has access. Other types of managed devices 110 may include, for example, computers, printers, security measures, and so forth.

In other examples, it may be desirable for managed device 110 to establish a secure connection with mobile device 100. This may be desirable when managed device 110 is designed to perform some service using data stored on mobile device 100. A secure connection may be established, for example, based on an exchange of secure keys between mobile device 100 and managed device 110 facilitated by identification server 120. In one example, managed device 110 may use the first public key maintained in the identifying information stored by identification server 120 as discussed above. Thus, when identification server 120 validates presence identifier 105, identification server 120 may transmit the first public key to managed device 110. Additionally, managed device 110 may transmit a second public key to mobile device 100. The second public key may be paired with a second private key held in a secure storage by managed device 110. Mobile device 100 may then validate the second public key with identification server 120 to ensure that managed device 110 is a device incorporated into the information technology infrastructure with which identification server 120 is associated. This validation, along with the receipt of the first public key by managed device 110 may complete a successful exchange of secure keys that can be used to ensure communication between mobile device 100 and managed device 110.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
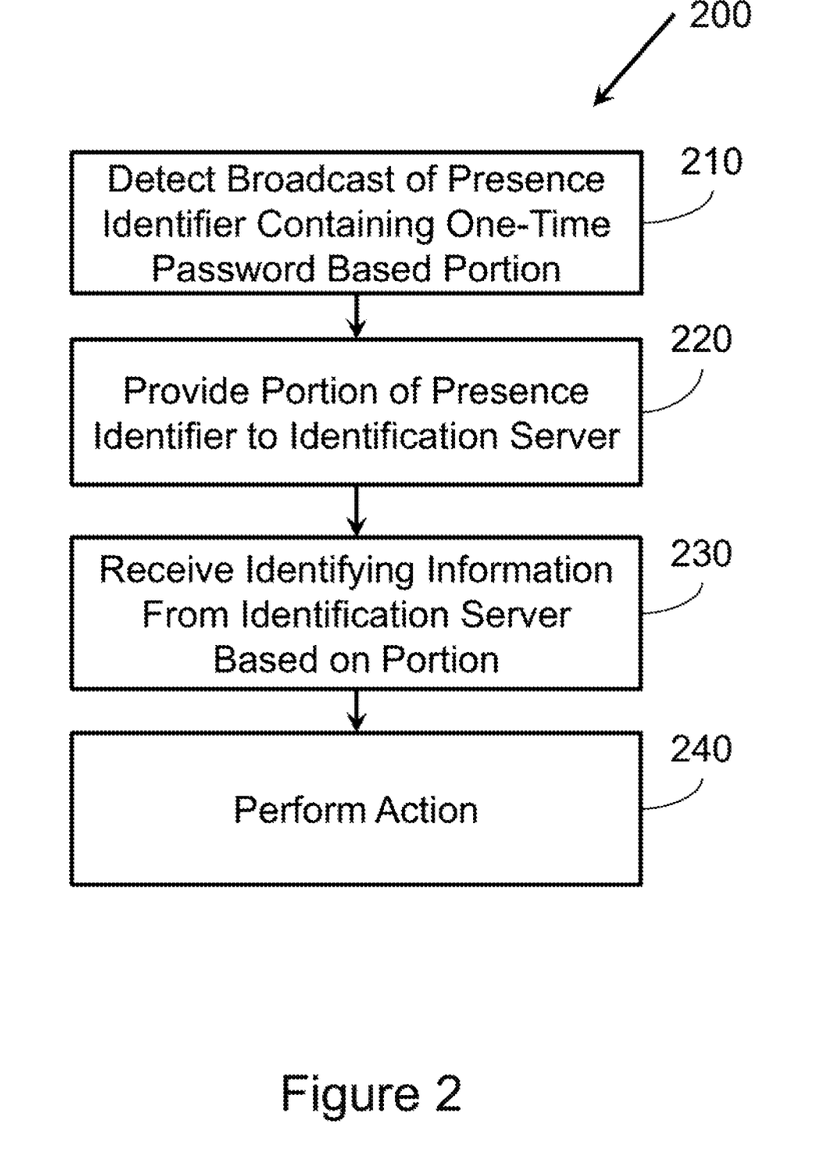
FIG. 2 illustrates a flowchart of example operations associated with presence identification.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with personal identification. In various examples, method 200 may be performed by a device managed as a part of a company's information technology infrastructure, similar to managed device 110 (FIG. 1). Method 200 includes detecting a presence identifier at 210. The broadcast may be received from a mobile device. Throughout method 200 transmissions involving the mobile device may occur, for example, via a pairing technology, such as Bluetooth, near field communication, WIFI, and so forth. The mobile device may be, for example, a cell phone, a laptop, a tablet, and so forth. The mobile device may belong to a user. A portion of the presence identifier may be generated based on a one-time password seed. The portion may also be generated based on a schedule known to the mobile device so that the mobile device periodically changes the presence identifier being broadcast. This may allow the mobile device to obfuscate the identity of a user of the mobile device.

Method 200 also includes providing the portion of the presence identifier to an identification server at 220. Method 200 also includes receiving identifying information at 230. The identifying information may be associated with the user. The identifying information may be received from the identification server. The identification server may use the portion of the presence identifier to identify the user based on the one-time password seed.

Method 200 also includes performing an action at 240. The action may be performed based on the identifying information. In various examples, the action may include granting the user access to an asset managed by a device performing method 200, provisioning a resource for the user, establishing a secure connection with the mobile device, and so forth.

By way of illustration, a secure connection may be established by an exchange of public keys that is verified by the identification server. For example, a first public key may be provided to the mobile device, which may then validate the first public key with the identification server. Further, a second public key associated with the mobile device may be included with the identifying information provided by the identification server. Thus, a device performing method 200 may be able to use the second public key to communicate securely with the mobile device, and the mobile device may be able to use the first public key to communicate securely with the device performing method 200.

Figure 3:
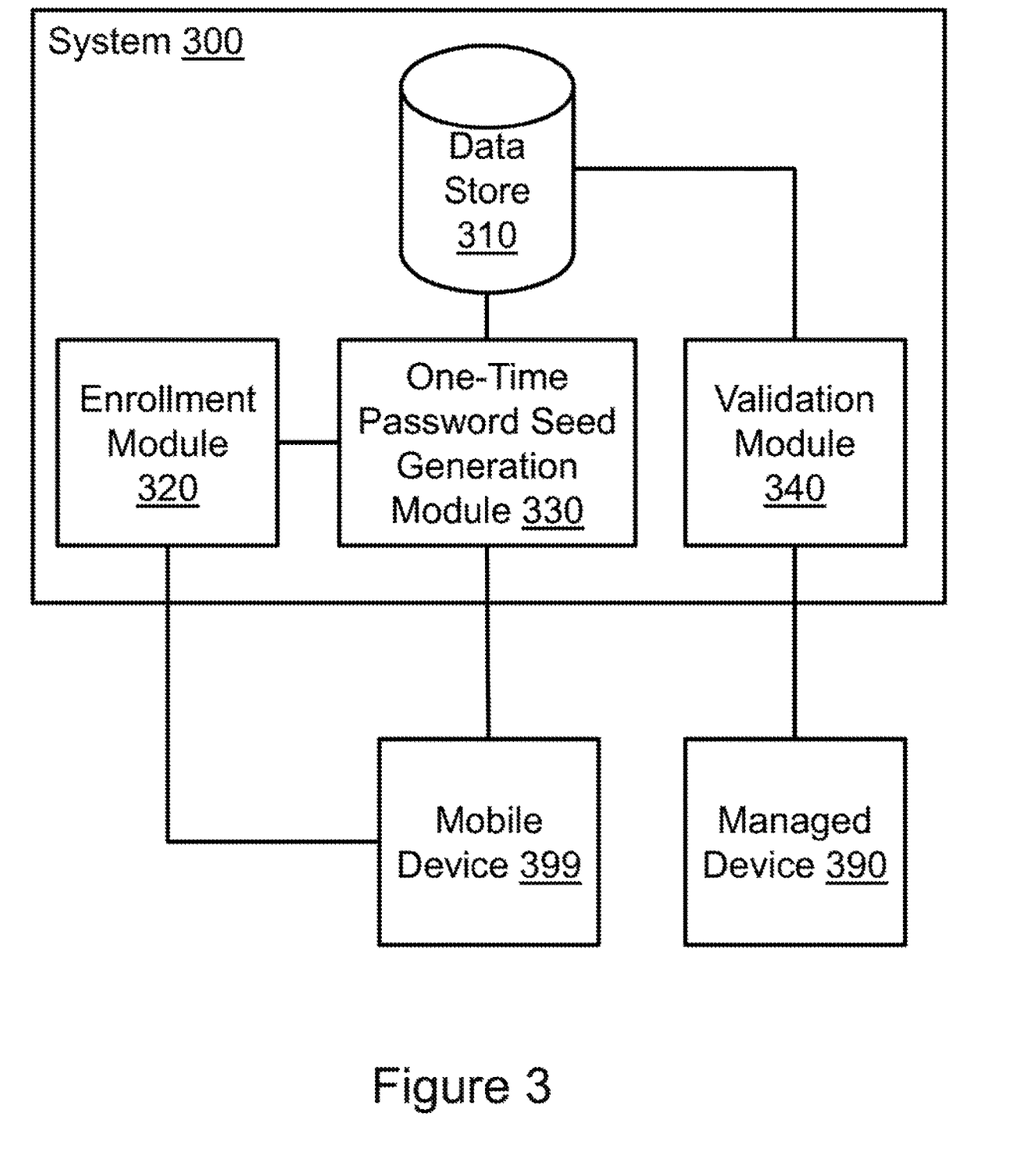
FIG. 3 illustrates an example system associated with presence identification.

FIG. 3 illustrates a system 300. System 300 includes a data store 310. Data store 310 may store sets of enrollment data associating users with mobile devices 399. Sets of enrollment data may include respective one-time password seeds.

System 300 also includes an enrollment module 320. Enrollment module 320 may receive an enrollment request from a user to associate a mobile device 399 with the user. In some examples, the enrollment request may be received from the mobile device 399 via an enrollment device (not shown). In this example, the one-time password seed may be provided to the mobile device 399 via the enrollment device.

System 300 also includes a one-time password seed generation module 330. One-time password seed generation module 330 may generate a one-time password seed for the mobile device 399. One-time password seed generation module 330 may also provide the one-time password seed to the mobile device. One-time password seed generation module 330 may also store a set of enrollment data in data store 310 that associates the user, the mobile device 399, and the one-time password seed.

System 300 also includes a validation module 340. Validation module 340 may receive a request from a managed device 390. The request from managed device 390 may be received in response to a presence identifier broadcast by the mobile device 399. The presence identifier may include a one-time password generated based on the one-time password seed in the mobile device 399. Upon receiving the request, validation module 340 may then validate the one-time password based on the one-time password seed stored in data store 310, and provide identifying information associated with the user to managed device 390. In some examples, providing the identifying information to managed device 390 may control managed device 390 to perform an action for the user of mobile device 399. By way of illustration, the identifying information may authorize the user to use a resource controlled by managed device 390.

In one example, the enrollment request received by enrollment module 320 may include a public key generated by the mobile device 399. The public key may be paired with a private key stored on the mobile device 399. The public key may be stared by one-time password seed generation module 330 in the data store as a part of the set of enrollment data associating the user, the mobile device 399, and the one-time password seed. In this example, when identifying information is provided by validation module 340 to managed device 390, the identifying information may include the public key. This may facilitate establishing secure communication between managed device 390, and the mobile device 399.

Figure 4:
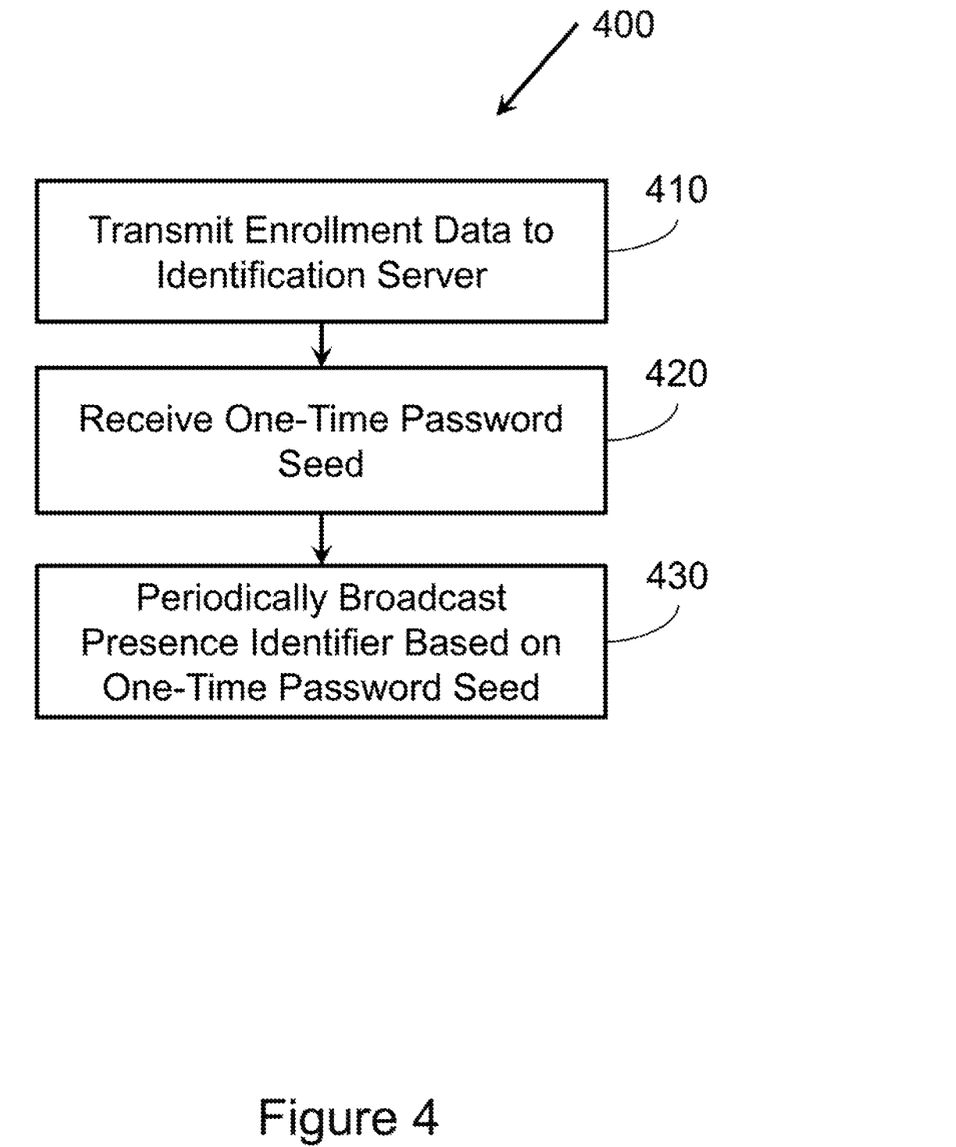
FIG. 4 illustrates another flowchart of example operations associated with presence identification.

FIG. 4 illustrates a method 400. Method 400 may be performed by a device such as mobile device 100 (FIG. 1). The device may be controlled by a user. Method 400 includes transmitting enrollment data to an identification server at 410. The enrollment data may include a first public key. The first public key may be paired with a first private key that is stored in the device. The enrollment data may be used by the identification server to associate a one-time password seed with a user of the device.

Method 400 also includes receiving the one-time password seed at 420. The one-time password seed may be received from the identification server. In some examples, the enrollment data transmitted to the identification server at action 410 may be transmitted via an enrollment device. In this example, the one-time password seed may be received from the identification server via the enrollment device.

Method 400 also includes periodically broadcasting a presence identifier at 430. The presence identifier may include a one-time password generated based on the one-time password seed. Thus, the presence identifier may periodically change based on the one-time password seed, which may obfuscate the identity of the user of the device. The presence identifier may be used by a managed device to obtain information identifying the user of the device from the identification server. The presence identifier and/or the information identifying the user of the device may be used by the managed device to perform an action on behalf of the user.

Figure 5:
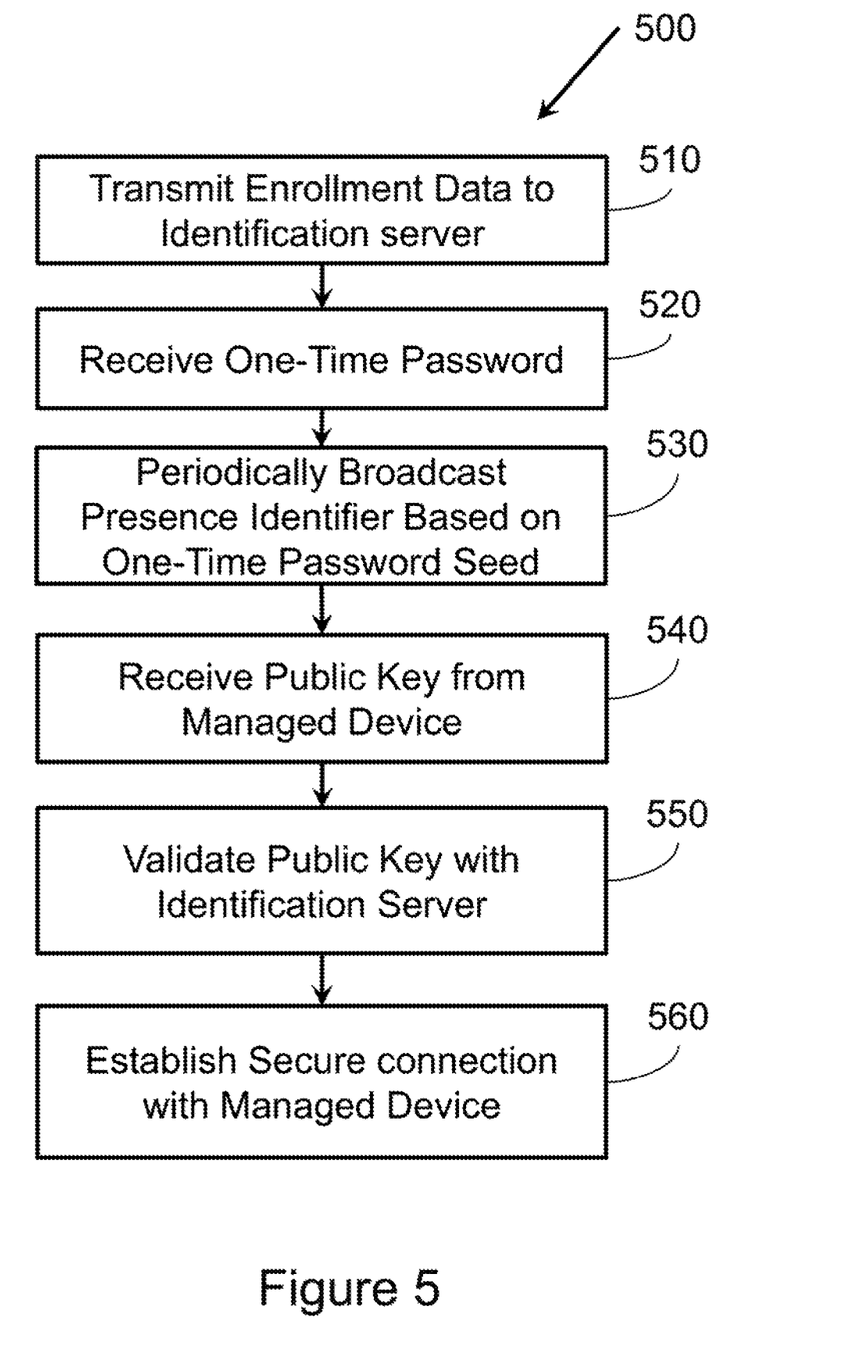
FIG. 5 illustrates another flowchart of example operations associated with presence identification.

FIG. 5 illustrates a method 500 associated with presence identification. Method 500 includes several actions similar to those described above with reference to method 400 (FIG. 4). For example, method 500 includes transmitting enrollment data to an identification server at 510, receiving a one-time password seed at 520, and periodically broadcasting a presence identifier at 530.

Method 500 also includes receiving a second public key at 540. The second public key may be received from a managed device that received a presence identifier broadcast at action 530.

Method 500 also includes validating the second public key with the identification server at 550. Validating the second public key may ensure to the device performing method 500 that the second public key is received from a device that is a part of the information technology infrastructure associated with identification server 550. Thus, validating the second public key may prevent the device performing method 500 from inadvertently transmitting sensitive information to an unauthorized device.

Method 500 also include establishing a secure connection with the managed device at 560. The secure connection may be established based on the second public key and based on the managed device receiving the first public key from the identification server in identifying information provided by the identification server to the managed device.

Figure 6:
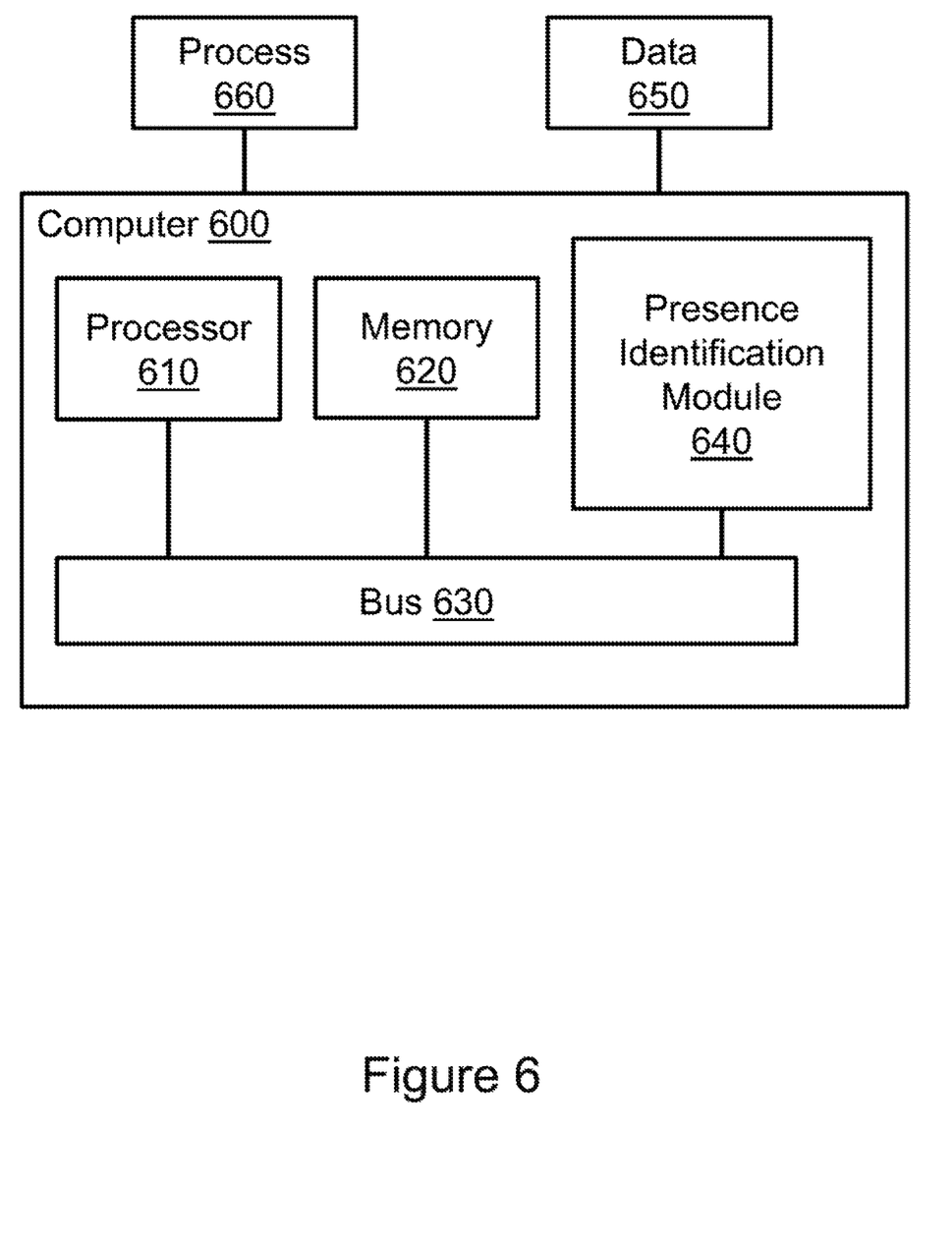
FIG. 6 illustrates an example computing device in which example systems and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a presence identification module 640. Presence identification module 640 may perform, alone or in combination, various functions described above with reference to the example systems, methods, and so forth. In different examples, presence identification module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:

detecting, at a first device, a presence identifier broadcast by a mobile device associated with a user, wherein a portion of the presence identifier is generated by the mobile device based on a one-time password seed transmitted by an identification server to the mobile device responsive to generation of the one-time password seed at the identification server that is separate from the mobile device;

providing, by the first device, the portion of the presence identifier to the identification server;

receiving, at the first device from the identification server, identifying information associated with the user, wherein the identifying information is received at the first device from the identification server responsive to validation of the portion of the presence identifier at the identification server based on a stored version of the one-time password seed at the identification server;

performing, at the first device, an action based on the identifying information, wherein the action comprises establishing a secure connection between the first device and the mobile device; and providing, by the first device, a first public key to the mobile device, wherein the identifying information received from the identification server includes a second public key associated with the mobile device, and wherein the secure connection between the first device and the mobile device is established based on the second public key received from the identification server and based on the mobile device validating the first public key, provided by the first device to the mobile device, with the identification server.

2. The method of claim 1, wherein the action further comprises one of granting the user access to an asset, or provisioning a resource for the user.

3. The method of claim 1, wherein the portion of the presence identifier that is generated based on the one-time password seed comprises a one-time password, and the one-time password is provided by the first device to the identification server.

4. The method of claim 3, wherein the one-time password is based on the one-time password seed and a timestamp.

5. A system comprising:

a storage device to store sets of enrollment data associating users with mobile devices, wherein the sets of enrollment data include respective one-time password seeds;

a processor; and a non-transitory storage medium storing instructions executable on the processor to:

receive an enrollment request from a user to associate a mobile device with the user;

generate a one-time password seed for the mobile device;

in response to generating the one-time password seed, transmit, from the system that is separate from the mobile device, the one-time password seed to the mobile device;

store, in the storage device, a set of enrollment data associating the user, the mobile device, and the one-time password seed;

receive a request from a managed device, the request being responsive to a presence identifier broadcast by the mobile device, wherein the presence identifier includes a one-time password generated based on the one-time password seed stored in the mobile device; and provide identifying information associated with the user to the managed device based on validating the one-time password in the presence identifier with a one-time password generated based on the one-time password seed stored in the storage device.

6. The system of claim 5, wherein the enrollment request includes a public key generated by the mobile device that is paired with a private key stored on the mobile device, and wherein the instructions are executable on the processor to store the public key in the storage device along with the set of enrollment data.

7. The system of claim 6, wherein the identifying information provided to the managed device includes the public key to facilitate establishing a secure communication between the managed device and the mobile device.

8. The system of claim 5, wherein the identifying information provided to the managed device is to control the managed device to perform an action for the user.

9. The system of claim 5, wherein the identifying information provided to the managed device authorizes the user to use a resource controlled by the managed device.

10. The system of claim 5, wherein the enrollment request is received from the mobile device via an enrollment device, and wherein the one-time password seed is transmitted to the mobile device via the enrollment device.

11. The system of claim 5, wherein the one-time password included in the presence identifier is based on the one-time password seed and a timestamp.

12. A non-transitory computer-readable medium storing instructions that when executed cause a mobile device to:

transmit enrollment data to an identification server, the enrollment data comprising a first public key that is paired with a first private key stored in the mobile device, and wherein the enrollment data is to cause the identification server to associate a one-time password seed with a user of the mobile device;

receive the one-time password seed from the identification server that is separate from the mobile device, wherein the one-time password seed is received from the identification server responsive to generation of the one-time password seed at the identification server;

broadcast, at different times, presence identifiers including respective different one-time passwords generated based on the one-time password seed and on corresponding timestamps associated with the different times; and receive, at the mobile device from a managed device, a second public key to establish a secure connection between the mobile device and the managed device, the second public key received at the mobile device from the managed device responsive to validation, by the identification server, of a given one-time password of the different one-time passwords that was sent from the managed device to the identification server.

13. The non-transitory computer-readable medium of claim 12, wherein the instructions when executed cause the mobile device to:
  validate the second public key with the identification server; and
  establish the secure connection with the managed device based on the second public key and based on the managed device receiving the first public key from the identification server.

14. The non-transitory computer-readable medium of claim 12, wherein the enrollment data is transmitted to the identification server via an enrollment device, and wherein the one-time password seed is received from the identification server via the enrollment device.

15. The non-transitory computer-readable medium of claim 12, wherein the instructions when executed cause the mobile device to:
  validate, by the mobile device with the identification server, the second public key received from the managed device; and
  establish the secure connection with the managed device using the second public key after the validating of the second public key.

\* \* \* \* \*